Figure 1:
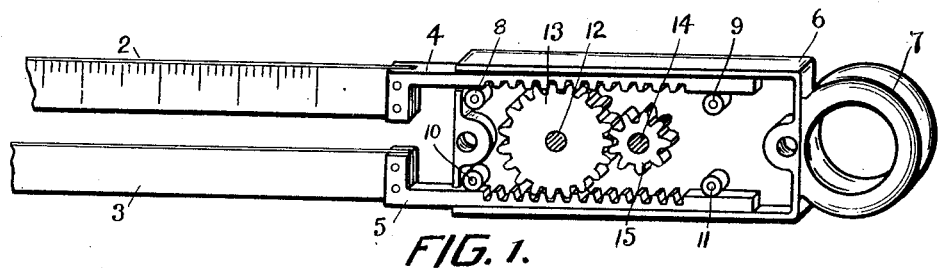

M. R. KONDOLF.
MEASURING DEVICE.
APPLICATION FILED NOV. 19, 1913.

1,116,079.  
Patented Nov. 3, 1914.

Witnesses  
Eric Ischinger.  
Edria Booth

Inventor  
Mathias R. Kondolf  
By Frank Keifer  
Attorney

UNITED STATES PATENT OFFICE.

MATHIAS R. KONDOLF, OF ROCHESTER, NEW YORK.

MEASURING DEVICE.

1,116,079.  Specification of Letters Patent.  Patented Nov. 3, 1914.

Application filed November 19, 1913. Serial No. 801,882.

*To all whom it may concern:*

Be it known that I, MATHIAS R. KONDOLF, a citizen of the United States, residing at Rochester, in the county of Monroe and State of New York, have invented certain new and useful Improvements in Measuring Devices, of which the following is a specification.

The object of this invention is to provide a measuring device that will not only measure lengths but will also indicate any correction that should be made due to expansion or contraction of the measuring device on account of change in temperature. This and other objects of the invention will be fully illustrated in the drawings, described in the specification and pointed out in the claims at the end thereof.

Figure 2:
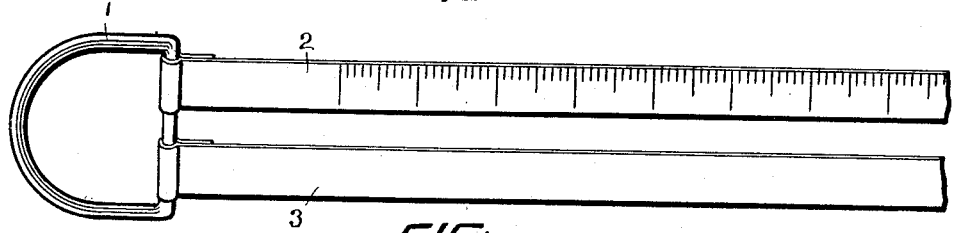
Figure 3:
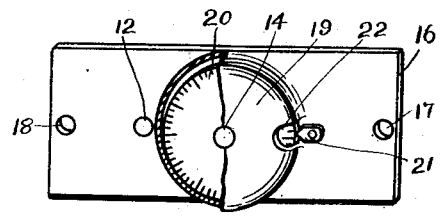
Figure 4:
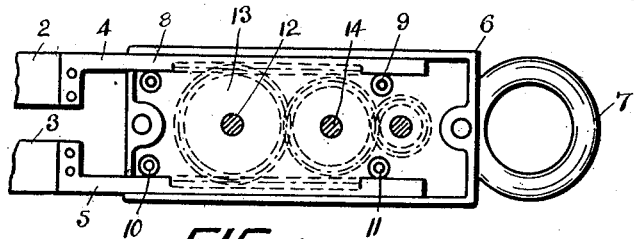

In the drawings, Figure 1 illustrates one end of the measuring device showing the casing from which the cover and part of the indicating device therein has been removed. Fig. 2 represents the other end of the measuring device. Fig. 3 shows the cover for the casing shown in Fig. 1, the cover being partly broken away to show the indicating device protected thereby. Fig. 4 is a modification of the indicating device.

In the accompanying drawings, like reference numerals indicate like parts.

In the drawings, reference numeral 1 indicates a handle to which is attached a steel tape 2 and a brass tape 3. It will be understood that the tapes may be of any other metals that will have a different co-efficient of expansion, steel and brass being preferred as being more suitable for the purpose. The steel tape is calibrated in inches or feet or in any desired way from zero up to any length that may be desired and the brass tape may be marked with marks coinciding with the end marks on the steel tape. The tapes and indicating mechanism will be so adjusted that these marks would exactly agree with each other at a certain predetermined temperature which temperature would preferably be 62°, the government standard.

At the opposite end of the steel tape is attached the rack 4 and to the end of the brass tape is attached the rack 5. These racks extend into a casing 6 which has a handle 7 on the end thereof. These racks are guided in the casing by studs or antifriction rollers 8, 9, 10 and 11 by which devices, the racks are held snugly against the side walls of the casing, permitting the rack to slide freely along the side of the casing.

Mounted in the casing is the stud 12 on which is mounted to rotate the pinion 13 which meshes with the racks 4 and 5. Also mounted in the casing is the shaft 14 on which is mounted to rotate the pinion 15. The shaft 14 and the pinion 15 are adapted to rotate together being mounted in suitable bearings in the casing and the cover therefor. The cover 16 is provided for the casing, this cover having the screw holes 17 and 18 at each end thereof and having the circular raised or embossed portion 19 in the middle thereof. On the end of the shaft 14 immediately under this embossed portion is mounted to rotate the indicating dial 20, the pinion 15, the shaft 14 and the indicating dial 20 all being keyed together so as to rotate in unison.

Mounted on the cover is the index pointer 21 which extends into a sight opening 22 under which the rotating dial is exposed and through which the position of the dial will appear.

The use or operation of the measuring device may be explained as follows: Tape is stretched with a tension of ten pounds or any other tension to which it may have been arbitrarily adjusted. If both tapes under this tension are at the standard temperature of 62°, the dial 20 should show in the opening 22 on zero position. If the temperature of the tapes is lower than the normal amount, the dial would rotate in one direction, due to the fact that the brass tape had shortened more than the steel tape and this rotation would indicate the amount that would have to be added to the rotating of the steel tape in order to give the correct measurement. If both tapes had lengthened, due to the increase of temperature over the standard of 62°, the dial 20 would rotate in the other direction and indicate the correction that would have to be subtracted from the steel tape in order to get the correct reading.

It will be understood that as the casing 6 is pulled to the right, the pinion 13 will move with it and will rotate to adjust itself to change any length of the tapes, which rotation will stop when the pinion is pulled by equal force with both tapes. This rotation of the pinion will be communicated to the dial 20 and will indicate on the dial the correction that must be made in the reading of the steel tape in order to get the correct measurement.

A large gear may be put on the shaft 14 which gear may in turn communicate with a small pinion on which pinion or its shaft, the dial 20 may be carried, thus multiplying the rotation of the dial until a sufficiently large indication is obtained. Such a train of gears is shown in Fig. 4.

I claim:

1. In a measuring device the combination of a pair of tapes, means for holding said tapes in fixed relation at one end, a rack on the opposite end in each of said tapes, a pinion placed between said racks, said racks engaging the opposite sides of said pinion, a casing in which said pinion is mounted to rotate on a fixed axis, said racks being adapted to slide on said casing and rotate the pinion or hold it balanced between them.

2. In a device for linear measurement, the combination of two long flexible tapes having different coefficients of expansion, means located at the outer ends of the tapes for holding those ends of said tapes in fixed relation to each other, independent means located at the inner ends of the tapes for holding said inner ends in variable relation to each other, said independent means having an indicating device, and means whereby said device is actuated by the movement of both tapes to correctly indicate the relative change of the lengths of the tapes.

3. In a device for linear measurement, the combination of two long flexible tapes having different coefficients of expansion, means located at the outer ends of the tapes for holding those ends of said tapes in fixed relation to each other, independent means located at the inner ends of the tapes for holding said inner ends of the tapes in variable relation to each other, said independent means having an indicating device, gearing between the ends of said tapes and said indicating device whereby said device is actuated by the movement of both tapes to correctly indicate the relative change of the lengths of the tapes.

In testimony whereof I affix my signature in presence of two witnesses.

MATHIAS R. KONDOLF.

Witnesses:
ALICE M. JOHANNS,
EDNA K. BOOTH.

---

Copies of this patent may be obtained for five cents each, by addressing the "Commissioner of Patents, Washington, D. C."